Jan. 19, 1960   KURT-GUNNAR SCHULTZ   2,921,704
LIFTMOBILE TRUCK

Filed Dec. 7, 1956   3 Sheets-Sheet 1

INVENTOR
KURT-GUNNAR SCHULTZ

BY *Deise and Craig*

ATTORNEYS

Jan. 19, 1960 KURT-GUNNAR SCHULTZ 2,921,704
LIFTMOBILE TRUCK
Filed Dec. 7, 1956 3 Sheets-Sheet 2

INVENTOR
KURT-GUNNAR SCHULTZ
BY
ATTORNEYS

Jan. 19, 1960   KURT-GUNNAR SCHULTZ   2,921,704
LIFTMOBILE TRUCK
Filed Dec. 7, 1956   3 Sheets-Sheet 3
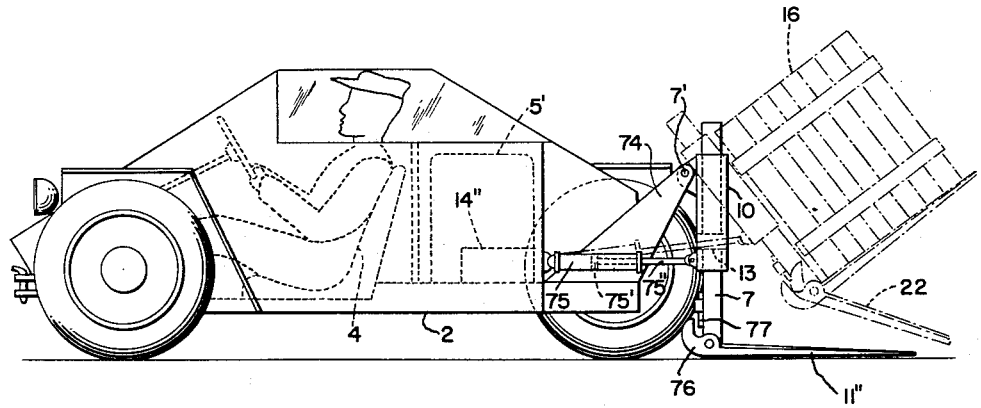
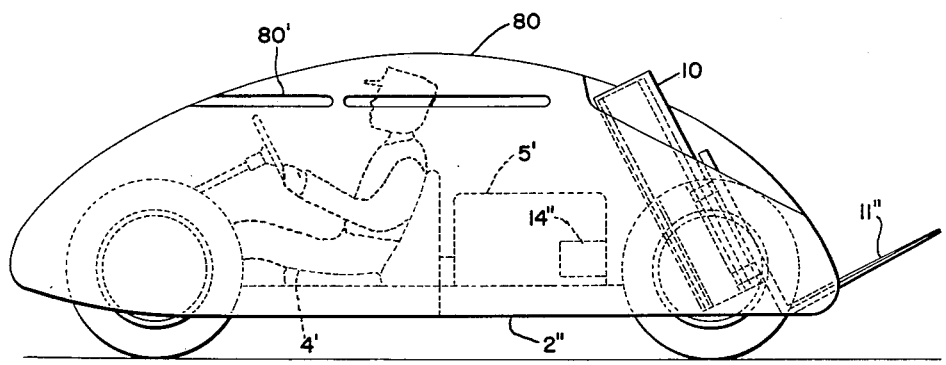
INVENTOR
KURT-GUNNAR SCHULTZ
BY
ATTORNEYS

United States Patent Office 2,921,704
Patented Jan. 19, 1960

2,921,704

LIFTMOBILE TRUCK

Kurt-Gunnar Schultz, Essen-Kupferdreh, Germany

Application December 7, 1956, Serial No. 626,896

Claims priority, application Germany March 31, 1956

8 Claims. (Cl. 214—674)

The present invention relates to motor vehicles equipped with an elevator-type hoist mechanism for picking up, moving, tiering and depositing loads in freight depots, railroad stations, mercantile buildings, industrial plants, etc.

Conventional prior art elevator-type vehicles or trucks generally have a relatively short wheel base for better maneuverability in congested places, have the elevator mounted and the operator seated on the forward or steering end of the truck, high up over the front axle and wheels, and have a counterbalanced rear or tail end for purposes of greater stability of the truck. However, these prior art vehicles or trucks are so constructed as to be limited for rather slow movement, generally not exceeding twelve m.p.h., viz. commensurate to their short range of action and the limited area under service, but not sufficient for the farther reaching purposes contemplated by the present invention for which they are totally unsuitable.

The present invention aims at providing an improved elevator-type motor truck or liftmobile, repowered, equipped and counterbalanced for faster transportation of the load under care, to more distant places, even off the road, where they may be urgently needed under adverse conditions, as after accidents, during strikes, rebellions, forest fires, etc.

More particularly, the present invention aims at adapting a motor vehicle or truck, for example, a commercially available vehicle such as a Jeep, by appropriate modification and reconstruction thereof to quickly pick up the load at a depot from the ground or from a lorry's platform, for instance, canned food and refreshments, packed in boxes, first-aid material, barbed wire spools, bundled on pallets, and various other auxiliary and protective articles, to expeditiously travel with the load at the usual convoy speed, about 25–30 m.p.h., even over rough ground and in roadless country, and to promptly deposit the load in dangerous places under fire from rebels, at dark, by dumping, i.e., without necessity of stopping the vehicle for purposes of unloading.

Accordingly, it is an object of the present invention to provide a motor vehicle provided with a hoist mechanism which obviates the disadvantages and limitations of the prior art vehicles of similar type.

Another object of the present invention resides in the provision of a conventional motor vehicle which may be equipped in a simple manner with an elevator-type hoist mechanism so as to utilize the vehicle for lifting the goods and re-depositing or dumping the same after transportation thereof on the vehicle at normal speeds of such vehicle and over such distances as the vehicle may be used otherwise in its travel.

Still another object of the present invention is the provision of a motor vehicle or truck provided with an elevator-type hoist mechanism which offers improved balancing of the hoist mechanism by the engine and weight of the driver itself, and, therefore, dispenses with the need for special counterbalancing weights.

A further object of the present invention is the provision of a motor vehicle having an elevator-type hoist mechanism which is so constructed and installed on the vehicle as to enable dumping of the carried pay-load without stopping the vehicle.

Another object of the present invention is the provision of a motor vehicle which is able to carry a pay load at substantial speeds over substantial distances such as food supplies, first-aid and other medical supplies or military supplies, and more particularly such a vehicle which also is capable of picking up these supplies and unloading the same without having to stop in its travel.

Further objects, features and advantages of the present invention will become more obvious from the following description when taken in connection with the accompanying drawing which shows, for purposes of illustration only, several preferred embodiments in accordance with the present invention, and wherein:

Figure 5 is a side elevational view of still another embodiment of a liftmobile truck according to the present invention, and Figure 6 is a side elevational view of a still further embodiment of a structurally modified liftmobile in accordance with the present invention.

Figure 1:
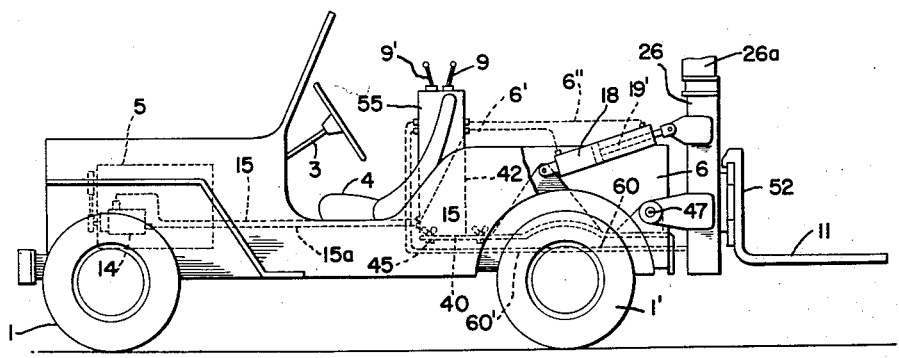
Figure 1 is a diagrammatic side view of a motor vehicle truck of the Jeep type, which is modified and converted into a fast travelling liftmobile in accordance with the present invention.

The present invention consists in brief of equipping a commercial type truck or vehicle such as a Jeep which is capable of overland travel and which may be driven in any suitable manner by the installation of a lift or hoist mechanism in a space provided in the rear of the vehicle by means of which the driver can pick up or unload the goods from the driver's seat by providing the hydraulic control mechanisms within easy reach of the driver. As a result of such a construction, the goods may be loaded or unloaded by the driver while remaining in his seat.

In brief, the liftmobile in accordance with the present invention which is reconstructed from other vehicles for the purposes concerned herein, originates from an ordinary sturdily-built motor truck, for instance, of the popular Jeep type, which includes front wheels 1, engine 5 and steering column 3 in the forward end thereof, a driver's seat 4 arranged therebehind, and rear wheels 1′ and a loading compartment 6 disposed in the rear end of the truck.

According to the present invention, such a prior art motor truck is re-equipped and deconstructed in the following manner.

A hydraulic pressure pump 14 is rotatably associated with the engine 5, counterbalancing jointly with the latter the truck's forward end. The pump 14 may be driven from the engine 5 in any conventional manner, for example, by a V-belt drive.

A base plate 40, formed with stiffening upwardly extending side flanges 4′, with a downwardly bent transverse flange 4″, and with upright side brackets 48 and 48′, is secured to the bottom of the loading compartment 6 in any conventional manner, for example, detachably by means of bolts (not shown) thereby additionally and amply stiffening and rigidifying the truck's tail end.

A short-lift hydraulic elevator, having U-shaped standards 26 and 26′ forming guide-ways for the struts 26a and 26a′, telescopingly sliding therein, (Figures 2, 3 and 4), is pivotally hinged at 47 and 47′ to the base plate 40 (Figures 1, 2, 3 and 4), and is adapted to be tilted inwardly and outwardly of the vehicle through relatively large angles of inclination for the purposes to be more fully described hereinafter.

Figure 3:
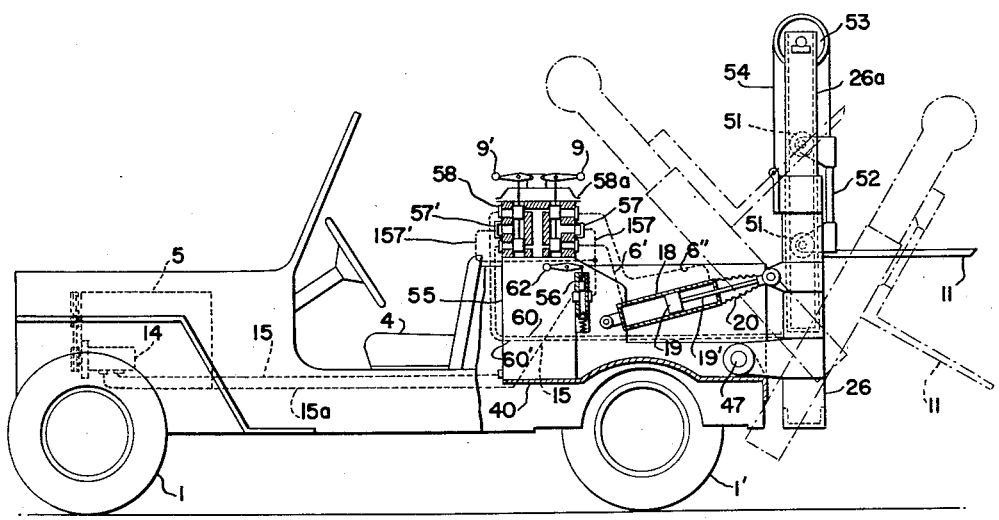
Figure 3 is a side elevational view, partly in vertical cross section and on a slightly larger scale, of slightly modified embodiment of a truck with an elevator-type hoist mechanism and showing in detail the hydraulic lifting, tilting and controlling mechanisms suitable for use in connection with both embodiments of Figures 1 and 2 and Figures 3 and 4.
Figure 4:
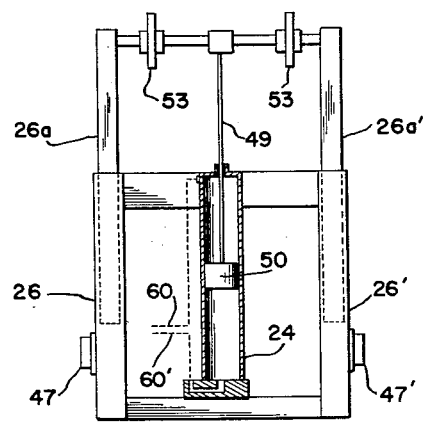
Figure 4 is a rear elevational view, partly in section, illustrating diagrammatically the elevator standards of the truck and the hydraulic lifting gear accommodated therein of the embodiment according to Figure 3.

A load supporting carriage 52, having slide rollers 51 and 51′ (Figure 3) and rearwardly extending lift fingers 11, 11′ (Figures 1, 2 and 3), is slidingly mounted in struts 26a, 26a′ by means of rollers 51 and 51′ which roll in appropriately shaped guide channels provided therein, and is raised and lowered by a ropes-and-sheaves multiplying mechanism 53, 54 in cooperation with a hydraulic master cylinder 24, piston 50 and rod 49, as seen in Figure 4, whereby upon raising or lowering of the struts 26a and 26a′ by the admission of pressure oil to the bottom or top of cylinder 24, the load supporting carriage 52 together with the lift fingers 11 and 11′ is also raised or lowered at a speed which depends on the effective transmission ratio obtained by the ropes-and-sheaves multiplying mechanism 53 and 54.

Auxiliary hydraulic cylinders 18 and 18′, each provided with pistons 19 and 19′ therein, are pivotally hinged at both the elevator standards 26 and 26′ and the brackets 48 and 48′ respectively of base plate 40, ande are adapted to tilt the elevator standards 26 and 26′ and therewith the load supporting carriage 52 either inwardly into a steeply inclined innermost position, shown in Figure 3 in dot-and-dash lines and designated by reference character *i*, in which position the load is retained and safeguarded by gravity during travel of the vehicle, or outwardly into a backwardly reclined outermost position, also shown in Figure 3 in dot-and-dash line and designated by reference character *o*, in which position the load is automatically released and dumped by gravity during travel of the vehicle.

The hydraulic-fluid lines, pipes and hoses, and associated control mechanism controlling the hydraulic circuits which are provided close to and within easy reach of the driver's seat 4 include the following elements:

A fluid accumulator or storage tank 55 (Figure 3) is connected with the pump 14 through suction line 15. A fluid return or pressure line 15a leads from pump 14 to a four-way fluid admission and check valve 56 operable by lever 62 and Bowden wires (not shown). The valve 56 is attached to the tank 55 and is in direct communication therewith over a spring-loaded safety or relief valve 59. The valve 56 is connected at 57 with an equilibrium fluid-distributing twin-valve 58a over line 157. The twin-valve 58a is adjustable by means of lever 9, and is in communication with the tilting cylinders 18 and 18′ over lines 6′ and 6″ respectively, the bottom or lower end of the twin-valve 58a being in direct communication with the tank 55.

Another equilibrium fluid-distributing twin valve 58, adjustable by means of lever 9′, and receiving fluid under pressure at 57′ from valve 56 over line 157′, is in communication with the elevator's lifting or master cylinder 24 over lines 60 and 60′, the bottom of twin-valve 58 being in direct communication with the tank 55, as shown in Figures 3 and 4.

Excellent results were obtained with a Jeep-type motor truck, having a hydraulic short-lift elevator tiltably mounted thereon at tail end thereof in accordance with the present invention having a 124 inch wheel base, and working with hydraulic pressures not exceeding 80 atmospheres ms.

Various changes and structural modifications may be made in and complementary features added to liftmobile trucks as shown and described herein, without departing from the spirit and basic concept of the present invention.

Figure 2:
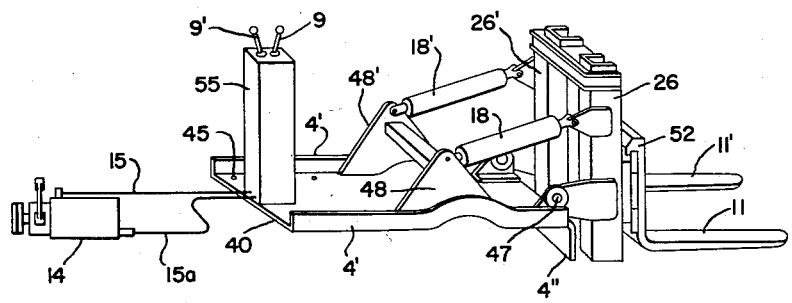
Figure 2 is a perspective view of the subassembly constituting the hydraulic lifting, tilting and controlling mechanisms in accordance with the present invention which is removably assembled on a reinforcing and rigidifying base plate.

For instance, the base plate 40 with the elevator, tilting cylinders, and hydraulic circuits and controlling mechanisms mounted thereon, may be adapted to be installed into the truck's loading compartment or removed therefrom as a complete unit or subassembly conveniently by means of screw bolts 45, as seen in Figures 1 and 2. Moreover, collapsible rubber bellows 20, as seen in Figure 3, may be connected to the outer ends of the tilting cylinders 18 and 18′ for protecting the piston rods 19′ in the exposed positions thereof.

In another structurally modified liftmobile truck, shown in Figure 5, instead of a base plate, of Figures 1 to 4, a low level frame 2 is provided, carrying the motor 5′ and hydraulic pump 14′ at the rear of the driver's seat 4″. The load lifting and tilting mechanisms in this case are also mounted on the truck's tail end, and include:

A couple of hydraulic master cylinders 10, having pistons 13 and rods 7 therein, and lift fingers 11′ hingedly attached to the rods 7, which rods 7 are pivotally mounted at 7′ on brackets 74 of frame 2. Auxiliary cylinders 75 with pistons 75′ and piston rods 75″ therein, hingedly interconnect the master cylinders 10 and frame 2. Hooks 76 are formed on the forward ends of the lifting fingers 11″, and catches 77 cooperating with hooks 76 are provided on the rods 7. The catches 77 are operable from the driver's seat in any suitable manner, for example, by Bowden wires (not shown). The load 16 can be released and deposited either by releasing the catches 77, as shown in Figure 5 in dot-and-dash line and indicated by reference numeral 22, or by outwardly tilting the elevator so as to dump the load during travel of the vehicle by appropriately actuating the hydraulic control mechanism. As seen in the position indicated in Figure 5 in dash lines, the load 16 is safely retained gravitationally by the inwardly, steeply reclining position of rods 7 and of lift fingers 11′, and may be still better secured thereto by elastic ropes wound therearound or loaded by springs.

In a similar, structurally complemented liftmobile truck, for possible use as military armored vehicle, shown in Figure 6, the low level frame 2″ has upright shields or armor plates 80 with viewing slots 80′ therein for protecting the driver against rifle fire from rebels or strikers.

The lift mechanism in the embodiment according to Figures 1 and 2 for the carriage 52 may be of the type described in connection with Figures 3 and 4 or of the type described in connection with Figure 5 depending on the particular use and requirements of the installation.

While I have shown and described several preferred embodiments in accordance with the present invention, it is understood that the same is not limited thereto but is susceptible of many changes and modifications within the spirit of the present invention, and I intend to cover all such changes and modifications except as defined in the appended claims.

I claim:

1. In a liftmobile truck adapted to load goods for transportation over substantial distances at normal speeds and adapted to unload the same while travelling the combination comprising an engine located forwardly in said truck, a driver's seat located rearwardly of said engine, a loading compartment being provided in the rear end of said truck, rearwardly of said driver's seat, an elevator type hoist mechanism formed as a detachable unit and including a base plate and frame means for said hoist mechanism connected to said base plate, means detachably connecting said base plate to said truck in said loading compartment, hydraulic means for raising and lowering said hoist mechanism and for tilting the same included in said unit, and means within easy reach of the driver's seat for actuating said hydraulic means, whereby the weight of the driver and of said engine is effective as a counterweight for said hoist mechanism, and whereby the payload carried on said hoist mechanism may be unloaded from said truck while the same is underway.

2. In a liftmobile truck the combination according to claim 1 wherein said frame means includes standards pivotally connected to said base plate, and wherein said hydraulic means includes a piston and cylinder arrangement connected between said standards and said base plate to provide pivotal movement of said standards.

3. In a liftmobile truck the combination according to claim 2, wherein said hoist mechanism includes rearwardly extending fingers forming a platform, and means for raising said platform along said standards.

4. In a liftmobile truck adapted to load goods for transportation over substantial distances at normal speeds and adapted to unload the same while traveling, the combination comprising an engine located forwardly in said truck, a driver's seat located rearwardly of said engine, a loading compartment being provided in the rear end of said truck and rearwardly of said driver's seat, an elevator type hoist mechanism formed as a subassembly and including a base plate and frame means for said hoist mechanism connected to said base plate, said frame means including standards pivotally connected to said base plate, said hoist mechanism including rearwardly extending fingers forming a platform, means for raising said platform along said standards, means detachably connecting said base plate to said truck in said loading compartment, hydraulic means for raising and lowering said hoist mechanism and for tilting the same, said hydraulic means including a piston and cylinder arrangement connected between said standards and said base plate for providing pivotal movement of said standards, and means including torque converting means within easy reach of the driver's seat for actuating said hydraulic means, whereby the weight of the driver and of said engine is effective as a counterweight for said hoist mechanism, and whereby the payload carried on said hoist mechanism may be unloaded from said truck while the same is underway.

5. In a liftmobile truck, the combination according to claim 4, further comprising a pump for said hydraulic means driven by said engine and located adjacent the same.

6. A portable tiltable lift mechanism for a motor vehicle with a low center of gravity and silhouette assembled as a unit comprising base plate means adapted to be secured to the chassis of said motor vehicle substantially adjacent an axle thereof, a pair of upright side brackets rigidly secured to either side of said base plate means, a pair of upwardly directed U-shaped standards pivotally secured to either side at one end of said base plate means and spaced from said upright side brackets, said U-shaped standards forming guideways for a pair of struts, auxiliary hydraulic tilting cylinder means pivotally secured to and connecting the upper ends of said upright side brackets with said U-shaped standards for tilting said U-shaped standards relative to said base plate means, said struts being rigidly connected together and mounted on rollers for traveling substantially the total length of said U-shaped standards, outwardly extending lift fingers secured to said struts for supporting a cargo, lift means including an hydraulic master cylinder for lifting said lift fingers and struts together, a source of hydraulic fluid under pressure for supplying said auxiliary hydraulic cylinder means and said hydraulic master cylinder, and remote control means for said auxiliary hydraulic cylinder means and said master cylinder mounted upon said base plate means at an end opposite to said U-shaped standards.

7. A portable tiltable mechanism according to claim 6, wherein said lift fingers are pivotally secured to said struts, and hook and catch means with release means attached thereto operatively connected to said struts and lift fingers whereby said hook and catch means can be released and the cargo dumped.

8. A portable tiltable lift mechanism according to claim 7, wherein said release means is a Bowden wire.

References Cited in the file of this patent

UNITED STATES PATENTS

| | | |
|---|---|---|
| 2,421,472 | Way | June 3, 1947 |
| 2,653,678 | Lehrman | Sept. 29, 1953 |
| 2,662,652 | Hubbard et al. | Dec. 15, 1953 |
| 2,684,165 | Hill | July 20, 1954 |
| 2,706,055 | Nichols | Apr. 12, 1955 |
| 2,723,771 | Brown | Nov. 15, 1955 |
| 2,732,087 | Pratt | Jan. 24, 1956 |

FOREIGN PATENTS

| | | |
|---|---|---|
| 329,460 | Great Britain | May 22, 1930 |
| 163,272 | Australia | June 8, 1955 |
| 1,012,586 | France | July 15, 1952 |